US008398354B2

(12) United States Patent
Sano et al.

(10) Patent No.: US 8,398,354 B2
(45) Date of Patent: Mar. 19, 2013

(54) BOOKBINDING APPARATUS

(75) Inventors: Kazuhide Sano, Minamikoma-gun (JP); Hideki Orii, Minamialps (JP); Keiichi Nagasawa, Minamialps (JP); Sei Takahashi, Minamialps (JP); Naoki Ueda, Yamanashi (JP); Suguru Maruyama, Minamikoma-gun (JP)

(73) Assignee: Nisca Corporation, Minamikoma-gun, Yamanashi-ken (JP)

( * ) Notice: Subject to any disclaimer, the term of this patent is extended or adjusted under 35 U.S.C. 154(b) by 295 days.

(21) Appl. No.: 12/662,725

(22) Filed: Apr. 30, 2010

(65) Prior Publication Data

US 2010/0278617 A1 Nov. 4, 2010

(30) Foreign Application Priority Data

May 1, 2009 (JP) ................................ 2009-112182

(51) Int. Cl.
*B42B 9/00* (2006.01)
*B23D 25/12* (2006.01)
*B26D 7/20* (2006.01)

(52) U.S. Cl. ............................... 412/16; 83/347; 83/659

(58) Field of Classification Search .................... 412/16; 83/659, 347; 399/408

See application file for complete search history.

(56) References Cited

U.S. PATENT DOCUMENTS

2004/0096253 A1 * 5/2004 Ueno et al. ...................... 412/16
2008/0310935 A1 * 12/2008 Hommochi et al. ............ 412/16

FOREIGN PATENT DOCUMENTS

JP H10-119000 A 5/1998

* cited by examiner

*Primary Examiner* — Dana Ross
*Assistant Examiner* — Kyle Grabowski
(74) *Attorney, Agent, or Firm* — Manabu Kanesaka

(57) ABSTRACT

A bookbinding apparatus for trimming sheets includes an adhesive applying device for applying adhesive to a back of the sheets; a trimming blade disposed in a trimming position; a bunch position changing device disposed in a transport path to change a position of the sheets in the trimming position; a blade receiving member having at least first and second blade receiving areas with different blade receiving surfaces contacting with the trimming blade; a driving device positioning the trimming blade between a cut position for bringing the trimming blade into contact with the blade receiving member and a spaced waiting position; a shift device selectively shifting one of the first and second blade receiving areas to a predetermined trimming position, and a control device for controlling the shift means and the driving means.

14 Claims, 8 Drawing Sheets

BOOKBINDING APPARATUS

BACKGROUND OF THE INVENTION

The present invention relates to a bookbinding apparatus having a trimming apparatus for trimming and cutting the outer edge of a bunch of sheets subjected to bookbinding processing, and more particularly, to improvements in trimming mechanism without staining the cover surface finished in book form.

Generally, such a type of trimming apparatus presses a bunch of sheets against a paper mount such as a table by a pressing mechanism to hold, and in this state, trims the outer edge of the bunch of sheets. As trimming of a bunch of sheets, for example, the apparatus performs trimming cut to trim and align three sides of a bunch of book-bound sheets or cuts a predetermined portion of a bunch of sheets to separate and cut to ½, ⅓ or the like, and such an apparatus has been known widely.

In thus trimming a bunch of sheets, when the sheets are cut using a flat-shaped trimming blade in a shape with a length corresponding to a width of the sheets, there are known a cutting mechanism in which a fixed blade is provided opposite to the trimming blade, and two these cutting edges act in scissors form, and another cutting mechanism in which a blade receiving member in cutting-board form is disposed in a position opposite to the trimming blade.

Conventionally, an apparatus for opposing a trimming blade and blade receiving member to cut is disclosed in, for example, Patent Document 1 (Japanese Unexamined Patent Publication No. H10-119000). The Document discloses the apparatus for cutting sheets mounted on a paper mount by up-and-down movements of the trimming blade. In this case, in the paper mount is embedded a soft material forming a blade receiving surface for receiving a cutting edge of the trimming blade. Polyurethane rubber is proposed as a material for the blade receiving material.

Further, as a similar mechanism, Patent Document 2 (Japanese Unexamined Patent Publication No. 2004-114198) proposes an apparatus where a blade receiving member is formed in the shape of a roll using a soft material and axially supported by an apparatus frame rotatably, and whenever a bunch of sheets is cut by a trimming blade, the roll is rotated a predetermined amount.

[Patent Document 1] Japanese Unexamined Patent Publication No. H10-119000

[Patent Document 2] Japanese Unexamined Patent Publication No. 2004-114198

As described above, when a bunch of sheets is trimmed by a flat-shaped trimming blade, it has already been known that a blade receiving member is made of a soft material to prevent a cutting edge of the trimming blade from wearing. In this case, when cutting is repeated using the trimming blade for a long time, it is known that a flaw occurs in the blade receiving surface of the blade receiving member and interferes with subsequent trimming. Therefore, conventionally, Patent Document 2 proposes forming the blade receiving member in the shape of a roll, and rotating the member a predetermined angle whenever cutting.

However, when a bunch of sheets to trim is a booklet subjected to glue bookbinding using an adhesive or case work, in the conventional method of rotating the blade receiving member at a predetermined pitch irrespective of trimming sides in cutting an upper-edge portion or lower-edge portion where the adhesive exists on the trimming end surface, and cutting a fore-edge portion where the adhesive does not exist, the cover surface may be stained in cutting the fore-edge portion. This is caused by the fact that the adhesive of the previously cut upper-edge portion or lower-edge portion adheres to the blade receiving surface and remains, and when the adhesive is in a semi-dry state, the adhesive is bonded to another bookbinding cover in a finish stacker, and thus results in failure in bookbinding, concurrently with staining. Particularly, when the upper-edge portion and lower-edge portion are trimmed, since the spine portion of the bunch of sheets is bonded using the adhesive, trimmed paper pieces are also bound. Therefore, when the upper-edge portion and lower-edge portion are trimmed, the paper debris drops from the blade receiving surface in a cluster under its own weight. In contrast thereto, in the fore-edge portion, since trimmed paper pieces are separate, when the adhesive adheres to the blade receiving surface, trimmed paper pieces may be bonded to the blade receiving surface and remain. When the remaining sheets are detected by a trimming jam sensor as a jam, the apparatus is halted.

The inventors of the invention noted that the adhesive that adheres to the blade receiving surface and remains results in a cause of a stain, etc. in subsequent trimming, the fore edge end is thereby stained in trimming the fore-edge portion, and that bookbinding quality thus remarkably deteriorates, and reached the idea of distinguishing between a blade receiving area in trimming the upper-edge portion or lower-edge portion and a blade receiving area in trimming the fore-edge portion to set in the blade receiving member.

It is a main object of the invention to provide a bookbinding apparatus having a trimming apparatus that does not stain a fore edge end by an adhesive adhering to a blade receiving surface in trimming a bunch of sheets subjected to bookbinding using the adhesive.

Further, it is another object of the invention to provide a bookbinding apparatus enabling increases in durability of a blade receiving member opposed to a trimming blade to trim a bunch of sheet.

SUMMARY OF THE INVENTION

To attain the aforementioned objects, the invention is characterized in that first and second, at least two, blade receiving areas with different blade receiving surfaces are set in a blade receiving member when a trimming blade and blade receiving member are disposed opposite to each other in a transport path of a bunch of sheets to trim and align the bunch of sheets, shift means for shifting positions of the first and second blade receiving areas is provided, and that the first blade receiving area and the second blade receiving area are selectively faced to a trimming position by the shift means corresponding to trimming sides of the upper-edge portion, lower-edge portion and fore-edge portion of the bunch of sheets.

A configuration for such a feature will specifically be described. A sheet bunch trimming apparatus for trimming and cutting a bunch of sheets subjected to bookbinding using an adhesive is provided with a transport path 33 for feeding a bunch of sheets to a predetermined trimming position G, a trimming blade 65$x$ disposed in the trimming position, a bunch position changing means 64, disposed in the transport path to change a position of the bunch of sheets in the trimming position, a blade receiving member 67 disposed opposite to the trimming blade with the bunch of sheets in the transport path therebetween, and a driving means Mc traveling between a cut position Cp for bringing the trimming blade into contact with the blade receiving member and a spaced waiting position Wp.

Then, in the blade receiving member are set first and second, at least two, blade receiving areas 67$a$, 67$b$, 67$c$ with different blade receiving surfaces coming into contact with the trimming blade, while the shift means MS for shifting positions between the first and second blade receiving areas is provided. Then, a control means 75*d* for controlling the shift means is configured so that the first blade receiving areas 67*a*, 67*b* and second blade receiving area 67*c* of the blade receiving member are selectively faced to the trimming position corresponding to the trimming side of the bunch of sheets in a position changed by the bunch position changing means.

In this case, in the trimming position are provided a backup member for supporting the bunch of sheets, and a trimming edge pressing means for pressing the bunch of sheets against the backup member to hold, the blade receiving member is disposed to be adjacent to the backup member, and it is configured that one of the first and second blade receiving areas comes into contact with the sheet surface of the bunch of sheets.

The invention provides the blade receiving member for trimming a bunch of sheets in cooperation with the trimming blade with first and second, at least two, blade receiving areas with different blade receiving surfaces, where the blade receiving member is shifted by the shift means to face the first and second blade receiving areas selectively to the trimming position corresponding to trimming sides of the upper-edge portion, lower-edge portion and fore-edge portion of the bunch of sheets, and therefore, exhibits the following significant effects.

Since the blade receiving member is shifted to face the first and second blade receiving areas selectively to the trimming position corresponding to the trimming side of a bunch of sheets in trimming the bunch of sheets set in the trimming position using the trimming blade, for example, by facing the first blade receiving area to the trimming position in trimming the upper-edge portion or lower-edge portion having an adhesive in part thereof, while facing the second blade receiving area to the trimming position in trimming the fore-edge portion, the adhesive adhering to the blade receiving surface does not stain the cover surface in trimming the fore-edge portion. Accordingly, it is possible to perform bookbinding processing rich in trimming quality.

Concurrently therewith, since the first and second, at least two, blade receiving areas are switched and positioned in the trimming position in the blade receiving member, the degree of wear of the blade receiving surface is alleviated, the durability increases, and it is possible to reduce the replacement of the blade receiving member as a consumable item. Further, in this case, the blade receiving areas are made different between the time of trimming the fore-edge portion and the time of trimming the upper-edge portion or lower-edge portion, and therefore, separate sheets of paper debris occurring in trimming the fore-edge portion do not adhere to the adhesive remaining on the blade receiving surface, and therefore, do not cause a trimming jam.

Further, in the invention, the backup member for supporting a bunch of sheets is provided in a position adjacent to the blade receiving member, the trimming edge pressing means is further provided to press the bunch of sheets against the backup member, the blade receiving surface to use is faced to the position coming into contact with the paper surface of the bunch of sheets, while the other blade receiving surface is shifted to a position on the back side that does not come into contact with the paper surface of the bunch of sheets, and therefore, trimmed paper pieces adhering to the adhesive are not bonded to the cover surface of the bunch of sheets.

Furthermore, by adopting a configuration that the blade receiving member is made circular or polygonal in cross section and is rotated and displaced, it is possible to switch between the blade receiving surfaces of the first and second, a plurality of, blade receiving areas to face to the trimming position with ease by the simplified structure.

DETAILED DESCRIPTION OF THE PREFERRED EMBODIMENTS

Figure 1:
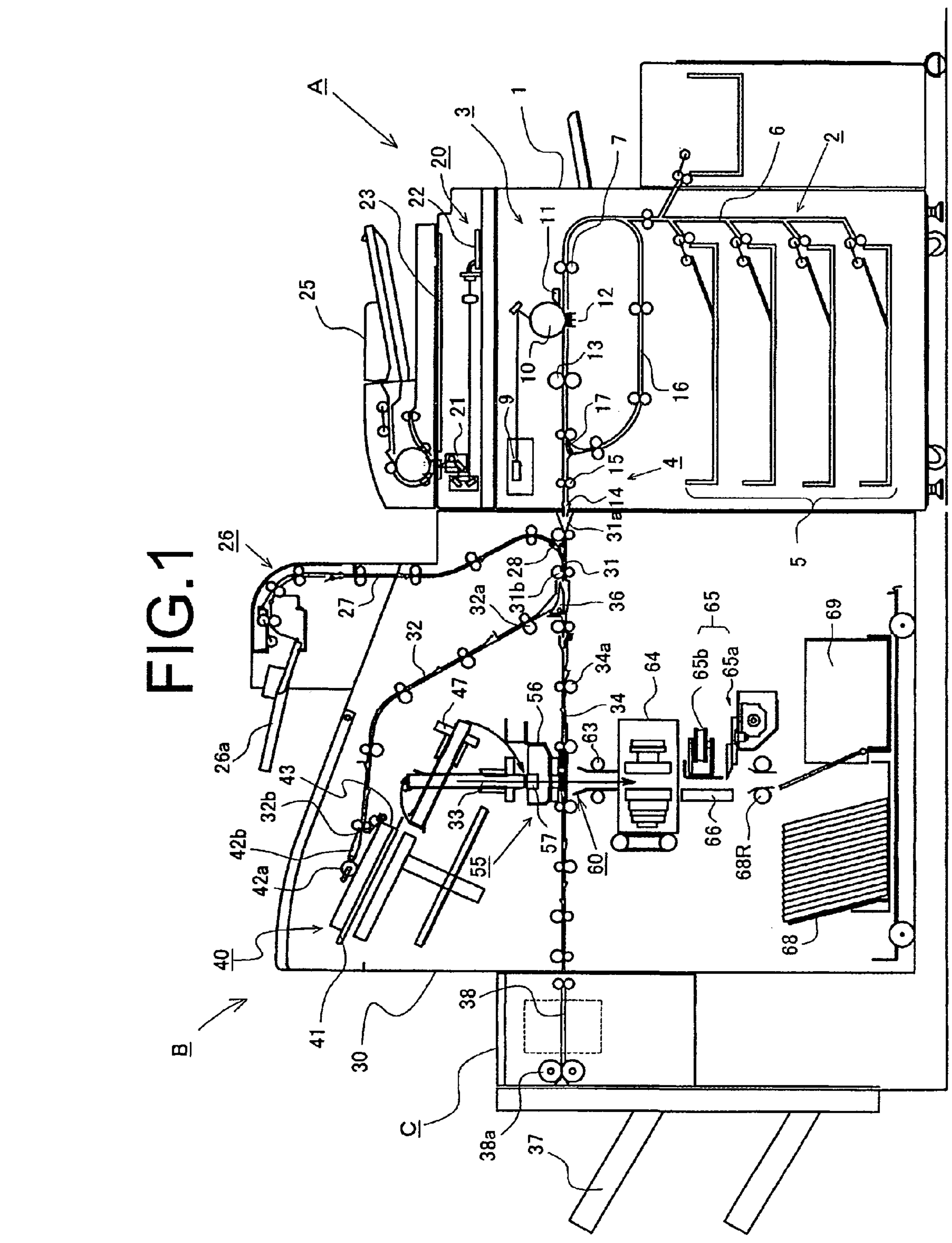
FIG. 1 is an entire configuration diagram of an image formation system provided with a bookbinding apparatus according to the invention.

The present invention will specifically be described below based on preferred Embodiments shown in the drawings. An image formation system as shown in FIG. 1 is comprised of an image formation apparatus A for forming images on sheets sequentially, and a bookbinding apparatus B which is coupled to a sheet discharge outlet of the image formation apparatus A, collates sheets with images formed thereon in bunch form to bind up, and then, performs cutting processing on the bunch of book-bound sheets. The apparatus of FIG. 1 is further provided with a post-processing apparatus C on the downstream side of the bookbinding apparatus B.

[Configuration of the Image Formation Apparatus]

As the image formation apparatus A, it is possible to adopt various structures such as a copier, printer and printing press, and as shown in FIG. 1, an electrostatic printing apparatus is shown in the figure. In the image formation apparatus A, a casing 1 is internally provided with a paper feed section 2, printing section 3, sheet discharge section 4 and control section. The paper feed section 2 is provided with a plurality of cassettes 5 corresponding to sheet sizes, and feeds a sheet of a size designated from the control section to a paper feed path 6. A resist roller 7 is provided in the paper feed path 6, aligns a front end of the sheet, and then, transports the sheet to the printing section 3 on the downstream side at predetermined timing.

The printing section 3 is provided with an electrostatic drum 10, and around the electrostatic drum 10 are disposed a printing head 9, developing device 11, transfer charger 12, etc. Then, for example, the printing head 9 is comprised of a laser emission device or the like, and forms an electrostatic latent image on the electrostatic drum 10, the developing device 11 adds toner ink to the latent image, and the transfer charger 12 prints the image on the sheet. The printed sheet is fixed by a fuser 13, and carried out to a sheet discharge path 17. In the sheet discharge section 4 are disposed a sheet discharge outlet 14 and sheet discharge roller 15 formed in the casing 1. In addition, "16" shown in the figure denotes a circulation path, where the printed sheet from the sheet discharge path 17 is reversed in side in a switch-back path and is fed to the resist roller 7 again, and an image is formed on the backside of the printed sheet. The printed sheet thus with the image formed on one side or both sides is carried out from the sheet discharge outlet 14 by the sheet discharge roller 15.

In addition, "20" shown in the figure denotes a scanner unit, and optically reads an original document image to be printed by the printing head 9. As is generally known, the configuration is comprised of a platen 23 on which an original document sheet is set, a carriage 21 for scanning the original document image along the platen 23, and an optically reading means (for example, CCD device) 22 for performing photoelectric conversion on an optical image from the carriage 21. Further, in the unit as shown in the figure, on the platen 23 is equipped an automatic document feeder 25 that automatically feeds an original document sheet to the platen.

[Configuration of the Bookbinding Apparatus]

Figure 2:
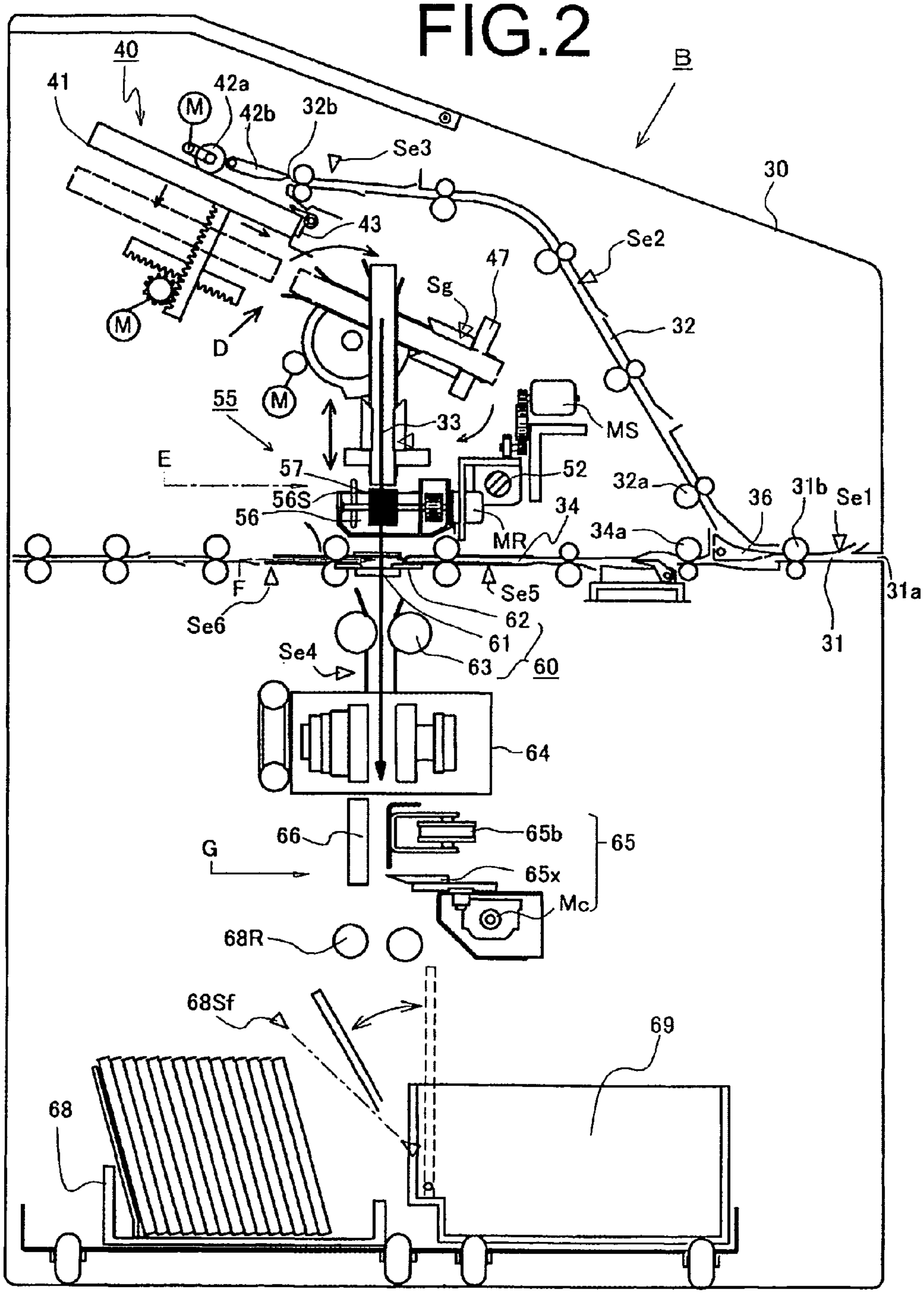
FIG. 2 is a specific explanatory view of the bookbinding apparatus in the system of FIG. 1.

The bookbinding apparatus B installed to the image formation apparatus B will be described next based on FIG. 2. The bookbinding apparatus B is comprised of a collecting section 40 for collecting and collating printed sheets in bunch form inside a casing 30, an adhesive applying means 55 for applying an adhesive to a bunch of sheets from the collecting section 40, and a cover fastening means 60 for fastening a cover sheet to the bunch of sheets with the adhesive applied thereto.

[Configuration of a Transport Path]

A transport path of each sheet will be described below. Inside the casing 30 is provided a carry-in path 31 having a carry-in entrance 31*a* coupled to the sheet discharge outlet 14 of the image formation apparatus A, and the carry-in path 31 is coupled to an inside-sheet transport path 32 and cover transport path 34 via a path switching flapper 36. Then, the inside-sheet transport path 32 is coupled to a bookbinding path 33 via the collecting section 40, and the cover transport path 34 is coupled to a post-processing path 38. The bookbinding path 33 is disposed in the substantially vertical direction that is the longitudinal direction of the apparatus, and the cover transport path 34 is disposed in the substantially horizontal direction that is the traverse direction of the apparatus.

The bookbinding path 33 and cover transport path 34 intersect (orthogonally), and a cover fastening means 60 described later is disposed at a portion of intersection. The carry-in path 31 configured as described above is coupled to the sheet discharge outlet 14 of the image formation apparatus A, and receives a printed sheet from the image formation apparatus A. In this case, from the image formation apparatus A are carried out printed sheets (inside-sheets) S1 with content information printed thereon, and a printed sheet (hereinafter, referred to as a cover sheet) Sh with a title, etc. printed thereon to be used as a front cover. Thus, the carry-in path 31 is divided to the inside-sheet transport path 32 and cover transport path 34, and allocates each printed sheet to the respective path via the path switching flapper 36 to transport.

Meanwhile, the carry-in path 31 is coupled to an inserter apparatus 26, and it is configured to separate cover sheets that do not undergo printing processing in the image formation apparatus A on a sheet-by-sheet basis from a paper feed tray 26*a* to supply to the carry-in path 31. The inserter apparatus 26 is provided with one or more-stage paper feed tray 26*a*, the tray is provided at its front end with a paper feed means for separating mounted sheets on a sheet-by-sheet basis to feed, and a paper feed path 27 is provided on the downstream side of the paper feed means, and is coupled to the carry-in path 31 via a path switching piece 28. Further, a transport roller 31*b* is disposed in the carry-in path 31, a transport roller 32*a* is disposed in the inside-sheet transport path 32, and in the bookbinding path 33 are disposed a grip transport means 47, bunch position changing means 64 described later, and sheet discharge roller (sheet discharge means) 67.

Further, a transport roller 34*a* and a transport roller 38*a* are disposed in the cover transport path 34 and the post-processing path 38, and are coupled to driving motors, respectively. "34g" shown in FIG. 3 denotes movable guides of the cover transport path 34, and a pair of guides are disposed respectively to the right and left of a cover fastening position F described later, and guide the upstream side and downstream side of the cover sheet Sh fed to the cover fastening position F. Further, the pair of movable guides 34*g* are coupled to a driving motor not shown to retract upward (in the cover fastening processing) from the cover fastening position F.

[Configuration of the Collecting Section]

A collection tray 41 disposed in a sheet discharge outlet 32*b* of the inside-sheet transport path 32 stores sheets from the sheet discharge outlet 32*b* in bunch form thereon. As shown in FIG. 2, the collection tray 41 is comprised of a tray member arranged in a substantially horizontal position, and is provided at its upper portion with a forward/backward rotation roller 42*a* and carry-in guide 42*b*. Then, a printed sheet from the sheet discharge outlet 32*b* is guided onto the collection tray 41 by the carry-in guide 42*b*, and stored by the forward/backward rotation roller 42*a*. The forward/backward rotation roller 42*a* shifts the printed sheet to the front end side of the collection tray 41 by forward rotation, while striking the sheet rear end against a regulation member 43 disposed in the tray rear end (right end in FIG. 2) to regulate by backward rotation. Further, the collection tray 41 is provided with a sheet side aligning means not shown to align in width the opposite edges of the printed sheet stored on the tray to reference positions. In such a configuration, printed sheets from the inside-sheet transport path 32 are stacked sequentially on the collection tray 41 and collated in bunch form.

A sheet bunch thickness identifying means not shown is disposed in the collection tray 41, and detects a thickness of a bunch of sheets collected on the tray. As the configuration, for example, a sheet contact piece coming into contact with the uppermost sheet is provided on the tray, a position of the sheet contact piece is detected by a sensor, and it is thereby possible to identify the thickness of a bunch of sheets. As another sheet bunch thickness identifying means, for example, a sheet discharge sensor Se3 detects a sheet carried out onto the collection tray, a counter is provided to count the signal from the sensor, the total number of sheets counted up to a job finish signal from the image formation apparatus A is multiplied by an average thickness of the sheet, and it is thereby possible to identify the thickness of a bunch of sheets.

[Configuration of a Sheet Bunch Transport Means]

In the bookbinding path 33 is disposed the grip transport means 47 for moving the sheets from the collection tray 41 to an adhesive applying position E on the downstream side. As shown in FIG. 2, the grip transport means 47 changes the bunch of sheets collected on the collection tray 41 from a horizontal position to a vertical position, and transports the bunch of sheets along the bookbinding path 33 disposed in the substantially vertical direction to set in the adhesive applying position E. Therefore, the collection tray 41 moves from a collection position (solid line in FIG. 2) to a delivery position (dashed lines in FIG. 2), and delivers the bunch of sheets to the prepared grip transport means 47 in the delivery position.

[Configuration of an Adhesive Applying Section]

The adhesive applying means 55 is disposed in the adhesive applying position E of the bookbinding path 33. As shown in FIG. 2, the adhesive applying means 55 is comprised of an adhesive container 56 for storing a hot-melt adhesive, application roll 57, and roll rotation motor MR. In the adhesive container 56 is disposed an adhesive sensor 56S for detecting a remaining quantity of the adhesive. The adhesive sensor 56S as shown in the figure works also as a temperature sensor of the adhesive, detects the temperature of the liquefied adhesive inside the adhesive container 56, and at the same time, detects the remaining quantity of the adhesive by a temperature difference in the portion immersed in the adhesive. Further, in the adhesive container 56 is embedded a heating means (not shown) such as an electric heater. Then, the adhesive sensor 56S and heating means are connected to a control CPU 75 described later, and adjust the temperature of the adhesive inside the adhesive container 56 to a predetermined melting temperature. Further, the application roll 57 is made of a heat-resistant porous material, impregnated with the adhesive, and is configured so that the adhesive layer is raised around the roll. Then, the adhesive container 56 reciprocates in a predetermined stroke from a home position along a bunch of sheets, and during the process of reciprocating, applies the adhesive to an end edge of the bunch of sheets with the application roll 57 inside the adhesive container 56.

[Configuration of the Cover Fastening Means]

The cover fastening means 60 is disposed in the cover fastening position F of the bookbinding path 33. As shown in FIG. 2, the cover fastening means 60 is comprised of a back support plate 61, back folding plates 62 and folding rolls 63. The cover transport path 34 is disposed in the cover fastening position F, and feeds the cover sheet from the image formation apparatus A or inserter apparatus 26. Then, the back support plate 61 is made of a plate-shaped member for backing up the cover sheet, and is disposed to be able to move forward and backward with respect to the bookbinding path 33. Then, a bunch of (inside) sheets S2 is joined in the shape of an inverse T to the cover sheet Sh supported by the back support plate 61. Then, the back folding plates 62 are comprised of a pair of right and left pressing members, and are configured to mutually close and separate by a driving means not shown so as to form the back portion of the cover sheet joined in the shape of an inverse T to a back folded form. Meanwhile, the folding rolls 63 are comprised of a pair of rolls for pressurizing the bunch of sheets with the back folded form to finish the folding.

[Configuration of a Sheet Bunch Feed Means (Bunch Position Changing Means)]

On the downstream side of the folding rolls 63 are disposed the bunch position changing means 64 for positioning and setting a bunch of sheets in a trimming position G, and a trimming means 65 for trimming the outer edge of the bunch of sheets. The bunch position changing means 64 shown in the figure changes between the upper and lower directions of the bunch of sheets. The bunch position changing means 64 changes the bunch of covered sheets fed from the cover fastening position F to a predetermined position, and feeds the bunch to the trimming position G on the downstream side.

Figure 3:
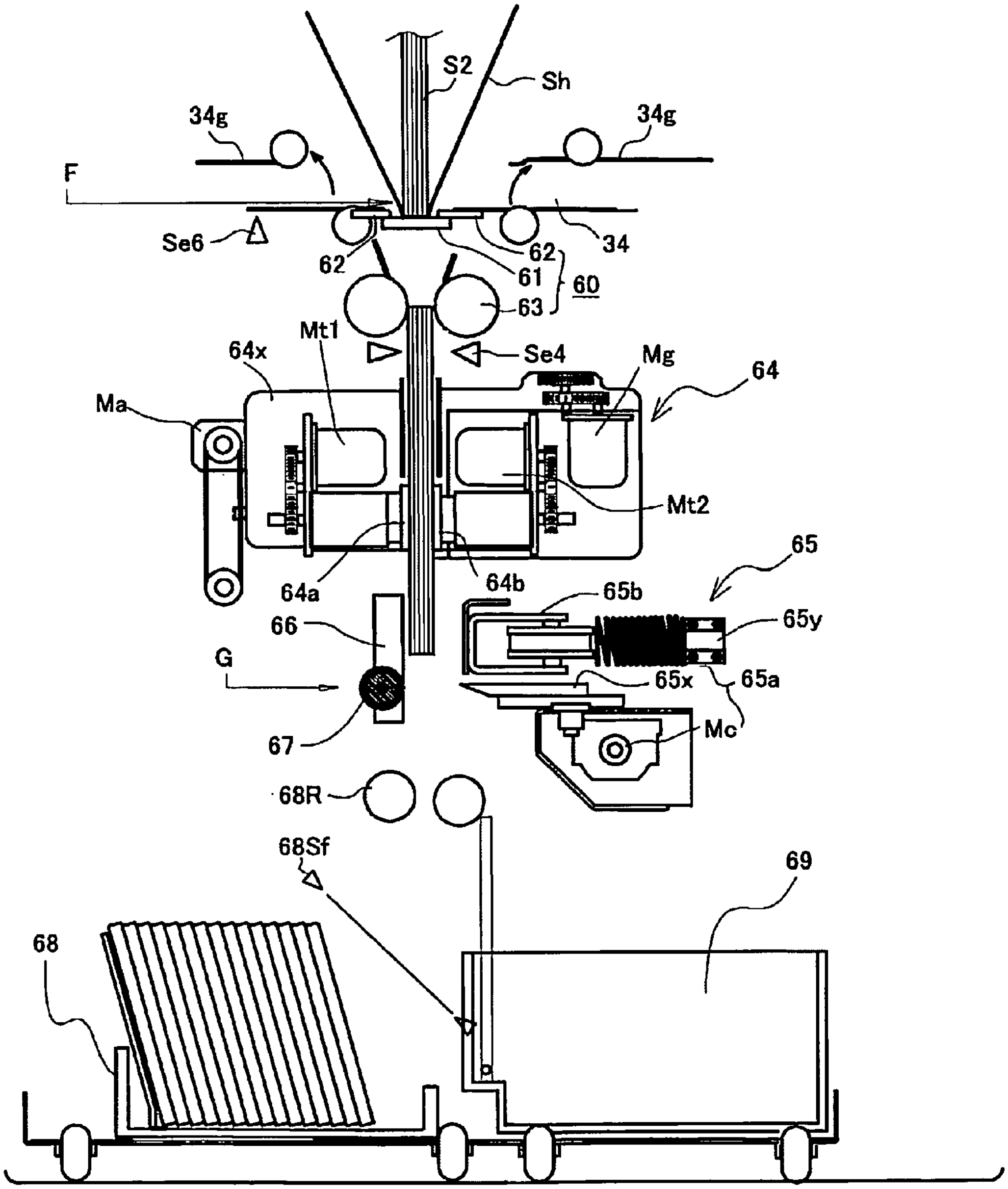
FIG. 3 is an explanatory view of an entire configuration of a trimming section in the apparatus of FIG. 2.

Therefore, the bunch position changing means 64 is provided with grip rotating members 64*a*, 64*b* for gripping and rotating the bunch of sheets fed from the folding rolls 63. As shown in FIG. 3, the grip rotating members 64*a*, 64*b* are provided in a unit frame 64*x* attached to the apparatus frame to be able to move upward and downward. The grip rotating members 64*a*, 64*b* are axially supported by the unit frame 64*x* to be both rotatable with the bookbinding path 33 therebetween, and one of the grip rotating members, 64*b*, on the movable side is supported to be able to move in the sheet bunch thickness direction (that is perpendicular to the bookbinding path 33). Then, the grip rotating members 64*a*, 64*b* are respectively provided with turn motors Mt1, Mt2 to change the position of the bunch of sheets inside the bookbinding path 33. Further, the grip rotating member 64*b* on the movable side is equipped with a grip motor Mg moving from side to side in FIG. 3. The bookbinding path 33 constitutes the transport path for feeding the bunch of sheets to the trimming position G.

Accordingly, the bunch of sheets guided to the inside of the bookbinding path 33 (transport path; the same in the following) is gripped and grasped by the left and right grip rotating members 64*a*, 64*b*, and the direction of a position of the bunch of sheets is changed by the turn motors Mt1 and Mt2. For example, the bunch of sheets that is carried in with the back portion on the lower side is turned 180 degrees, and is fed to a sheet discharge roller 68R on the downstream side with the fore-edge portion on the lower side. Further, the bunch of sheets is rotated 90 degrees sequentially to shift the upper-edge portion, lower-edge portion or fore-edge portion to the lower side in the trimming position G on the downstream side, and it is thereby made possible to perform trimming cut for trimming the outer edge in three directions of the bunch of sheets. In addition, the grip rotating member 64*b* on the movable side is provided with a grip sensor (not shown) so as to detect that the bunch of sheets is securely gripped between the left and right grip rotating members 64*a*, 64*b*, and after the detection, it is configured to drive and turn the grip rotating members 64*a*, 64*b*. Then, the unit frame 64*x* can move the bunch of sheets upward and downward along the bookbinding path 33 by a lifting/lowering motor Ma. This is because the bunch of sheets is transported and set in the trimming position G in trimming and cutting the outer edge of the bunch of sheets and a trimming width (cut amount) in the trimming position G is set by a feed amount.

[Configuration of the Trimming Means]

The trimming means 65 is disposed on the downstream side of the bunch position changing means 64. As shown in FIG. 3, the trimming means 65 is comprised of a trimming edge pressing means 65*b* for pressing a trimming edge of a bunch of sheets against a backup member 66, and a trimming means 65*a*. The trimming edge pressing means 65*b* is comprised of a pressing member 65*b* for pressing the bunch of sheets, and a biasing means (spring 65*y*) for applying a pressing force to the pressing member. The trimming blade unit 65*a* is comprised of a flat-blade-shaped trimming blade 65*x* and a cutter motor (driving means) MC for causing the trimming blade to reciprocate. By the trimming means 65 with the aforementioned configuration, the outer edge except the back portion of the bunch of sheets subjected to bookbinding processing in book form is trimmed by a predetermined amount and cut to be aligned.

Figure 5A:
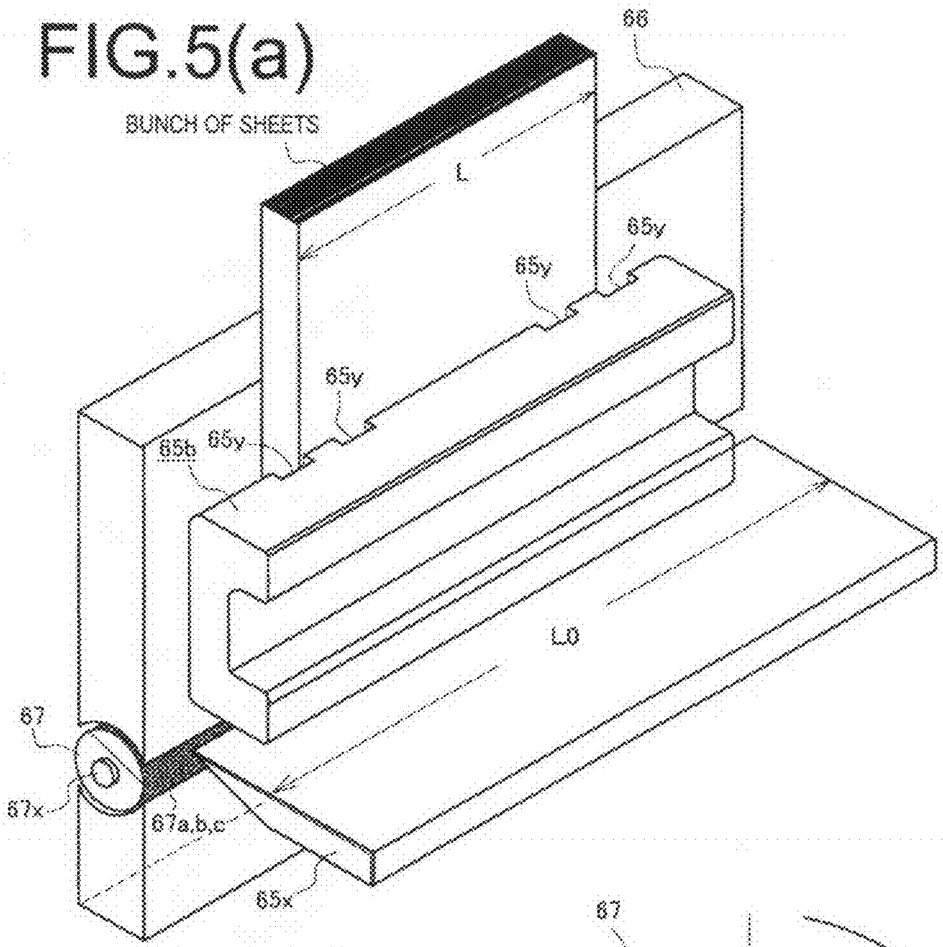
FIG. 5 shows a configuration of a blade receiving member in the apparatus of FIG. 3, where FIG. 5(*a*) is perspective explanatory view of the member, and FIG. 5(*b*) is an explanatory view of a shift means for changing an area of the blade receiving member.
Figure 5B:
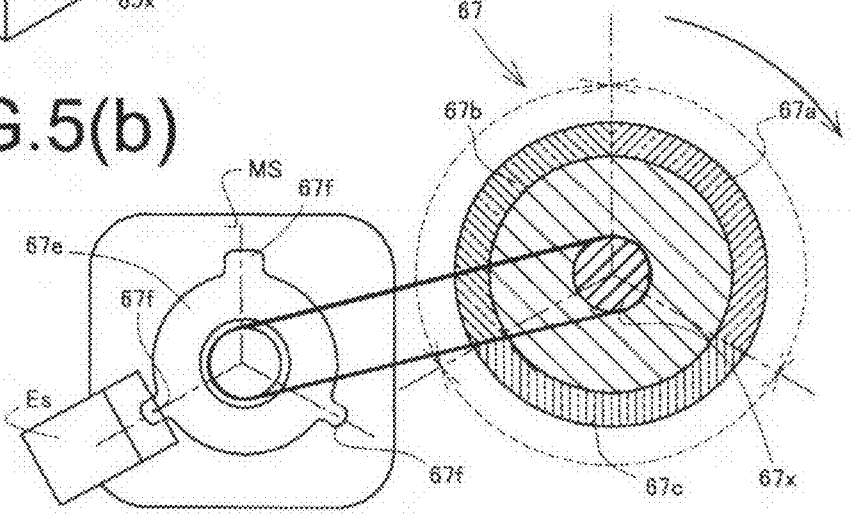
Figure 6A:
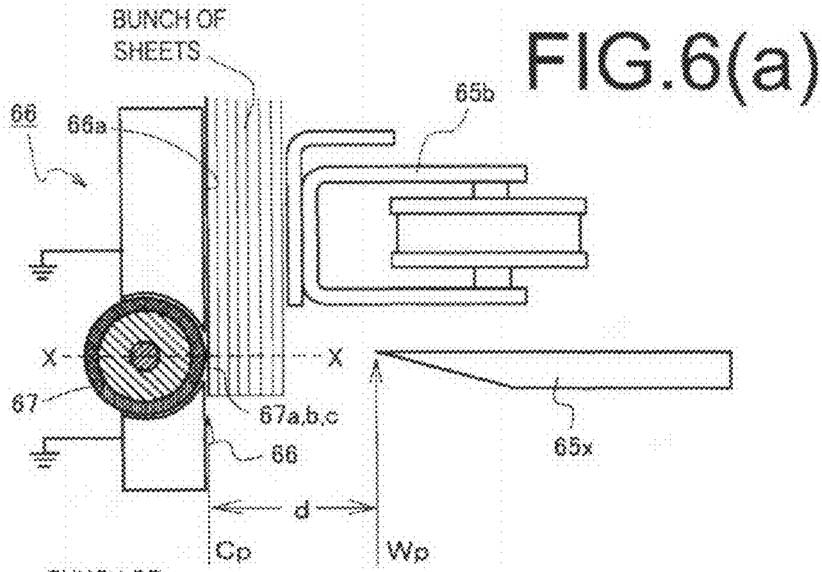
FIG. 6 contains operation explanatory views of a trimming means in the apparatus of FIG. 2, where FIG. 6(*a*) shows a state in which a trimming blade is in a waiting position, FIG. 6(*b*) shows a state in which the trimming blade is in a trimming position, and FIG. 6(*c*) is a perspective view showing a trimming state.
Figure 6B:
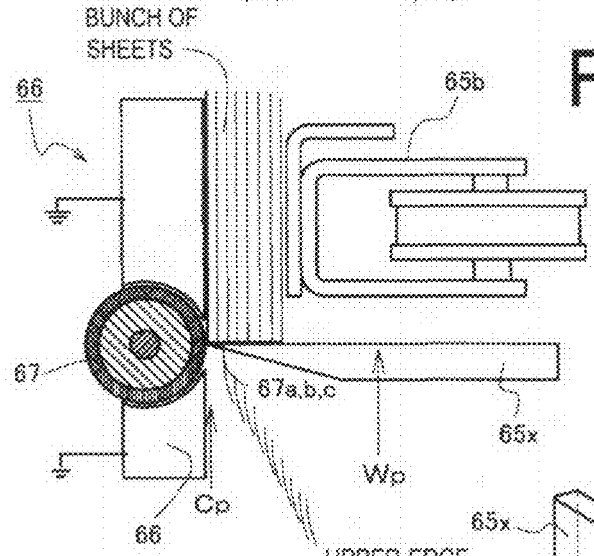
Figure 6C:
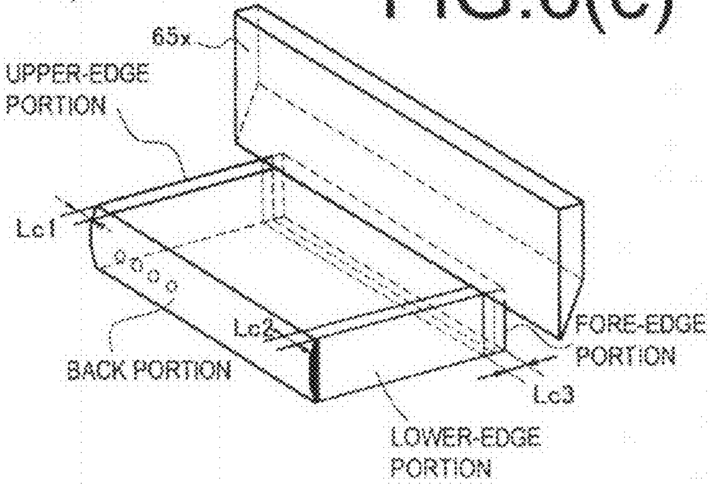

As shown in FIG. 5(*a*), the trimming blade 65*x* has a flat-blade-shaped cutting edge, is configured in blade width L0 longer than the sheet width L, supported to be able to travel between a waiting position Wp (state in FIG. 6(*a*)) at a distance d from a blade receiving member 67 and a cut position Cp (state in FIG. 6(*b*)) coming into contact with the blade receiving member as shown in FIGS. 6(*a*) and 6(*b*), and is coupled to the cutter motor (driving means) Mc to reciprocate.

[Configuration of the Blade Receiving Member]

Figure 4:
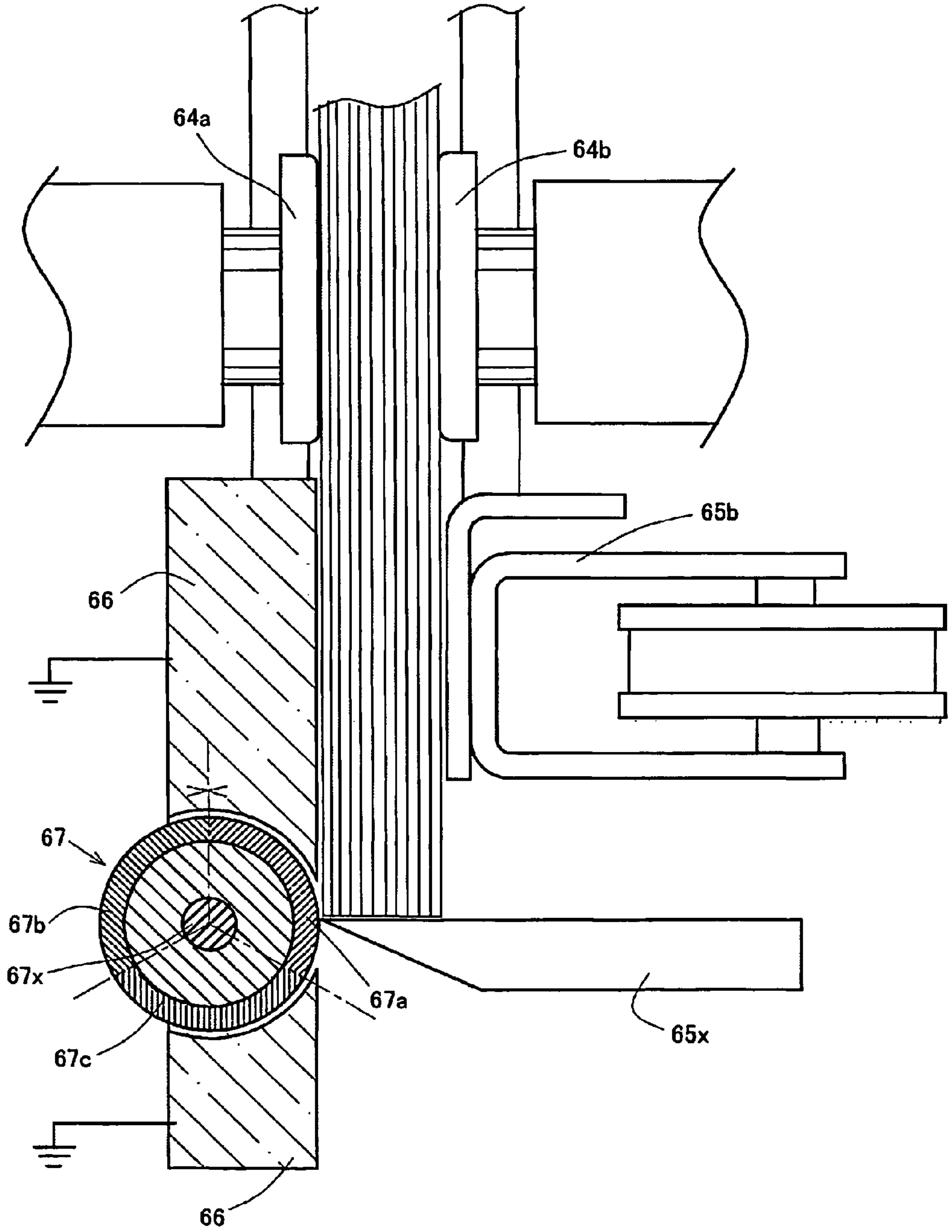
FIG. 4 is a mechanism explanatory view of a trimming position in the apparatus of FIG. 3.

Then, in the invention, the blade receiving member 67 is adjacent to the backup member 66 on the downstream side of the backup member 66, and is disposed in the position (trimming position G) opposite to the cutting edge of the trimming blade 65x. With respect to this state, FIG. 4 shows the cross-sectional shape, and FIG. 5 shows the perspective shape. The blade receiving member 67 is disposed opposite to the trimming blade 65x with the sheets (bunch) existing therebetween, and is supported by the apparatus frame (not shown) to be movable in position. The blade receiving member 67 shown in the figure is formed in the shape of a cylinder, the outer surface is divided into three areas, 67a, 67b, 67c, the area 67a and area 67b form a first blade receiving area, and the area 67c forms a second blade receiving area. Then, as described later, the division is made so that the area 67a comes into contact with the cutting edge of the trimming blade in trimming the upper-edge portion of the bunch of sheets, the area 67b comes into contact with the cutting edge in trimming the lower-edge portion, and that the area 67c comes into contact with the cutting edge in trimming the fore-edge portion. Then, the cylindrical blade receiving member 67 is axially supported by the apparatus frame at a rotary shaft 67x provided in the shaft center thereof.

The blade receiving member 67 axially supported rotatably at the rotary shaft 67x is coupled to a driving motor (shift means) MS (see FIG. 5(b)). The rotary shaft of the motor is integrally provided with an encoder 67e having flags 67f, and an encoder sensor ES is disposed to detect three flags 67f. The flags 67f are to detect positions of the areas 67a, 67b, 67c of the blade receiving member 67, respectively. Then, it is configured that a rotation amount of the shift means MS is detected by the flags 67f to position each of the areas 67a, 67b, 67c selectively in the trimming position.

By such a configuration, it is possible to place the first and second, a plurality of, blade receiving surfaces to be opposite to the trimming blade 65x. In addition, in the invention, the case is shown that the blade receiving member 67 is configured in the shape of a cylinder, but the blade receiving member can be formed in the shape of a polygon (hexagon, octagon, etc.), and further, it is also possible to form the blade receiving member using a flat-shaped rectangular member.

For the blade receiving member 67, for example, materials are selected as described below. First, selected is a material that is the most suitable to the trimming blade as a blade receiving surface. The blade receiving surface is made of a material having hardness of the extent to which the cutting edge of the trimming blade does not wear in cutting, and concurrently, elasticity of the extent to which a cut paper piece is not held when the trimming blade strikes and cuts, and the surface shown in the figure is made of a polypropylene resin. Accordingly, the blade receiving surface is made of a non-conductive material, and the backup member 66 as described previously is made of a resin material with conductive power such as tin added thereto to be conductive. The conductive backup member 66 is grounded. The reason why the backup member 66 is configured to be conductive is that paper debris cut in the cutting line X-X is dropped under its own weight to be stored in a debris box 69 without undergoing electrostatic adsorption.

[Configuration of the Pressing Member]

In a bunch of sheets as shown in the figure, since case work is performed using the cover sheet Sh as described previously, the spine fastening end edges bulge. Therefore, as shown in FIG. 5(a), in the pressing member 65b, concave recess grooves 65y are formed in positions for supporting the spine fastening end edges of a bunch of sheets to embed the spine fastening end edges of the bunch of sheets in the concave recess grooves 65y. In other words, in the blade receiving member 67 and pressing member 65b for pressing and supporting the bunch of sheets in the trimming position G, both or one of the members is provided with the concave recess grooves 65y adapting to the back-portion end edges (shoulder portions) of the bunch of sheets. Then, one or a plurality of concave recess grooves 65y is formed to each of the right and left of the bunch of sheets corresponding to the sheet size. In the apparatus as shown in FIG. 5, total four concave recess grooves 65y are formed, two grooves at each of the right and left, in the pressing member 65b.

[Discharge Structure of a Bunch of Sheets]

A sheet discharge roller (sheet discharge means) 68R and storage stacker 68 are disposed on the downstream side of the trimming position G. As shown in FIG. 2, the storage stacker 68 stores the bunch of sheets in a standing position. Then, as shown in FIG. 1, the storage stacker 68 is disposed in the casing 30 in drawer form, and is configured to be drawn to the apparatus front side (front side as viewed in FIG. 1). In addition, "68Sf" shown in the figure denotes a full detecting sensor, detects a full state of bunches of sheets stored in the storage stacker 68, and alerts an operator to the removal.

[Configuration the Post-processing Apparatus]

The post-processing apparatus C is disposed in the above-mentioned bookbinding apparatus B, and is provided with the post-processing path 38 coupled to the cover transport path 34, in the post-processing path 38 are disposed post-processing apparatuses such as a stapling unit, punch unit and stamp unit, and the apparatus C receives a printed sheet from the image formation apparatus A via the cover transport path 34, and performs stapling processing, punch processing and stamping processing on the printed sheet to carry out to a sheet discharge tray 37. Further, a sheet from the image formation apparatus A which does not need to undergo such post-processing is stored on the sheet discharge tray 37.

[Configuration of Control Means]

Figure 7:
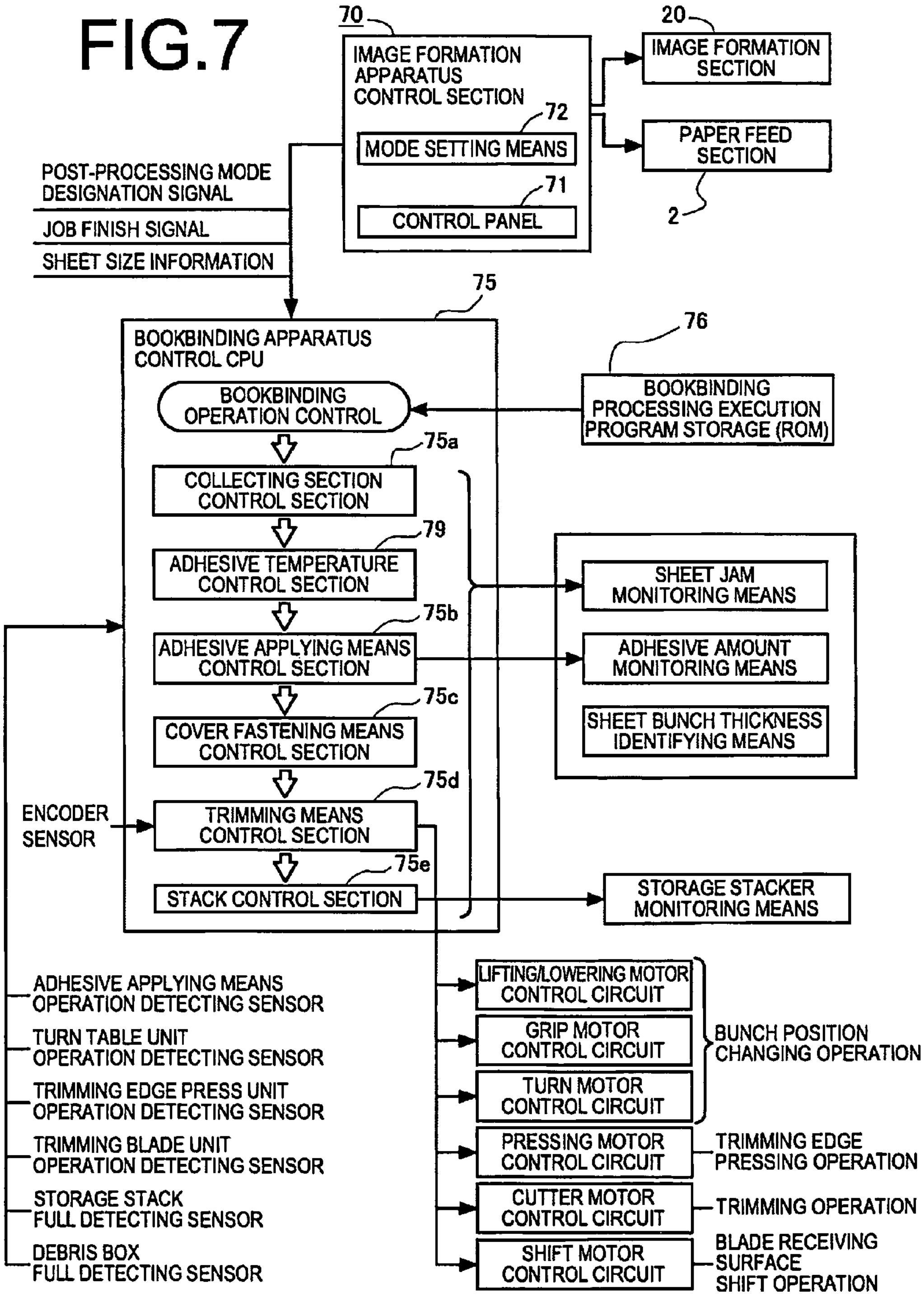
FIG. 7 is a block diagram illustrating a configuration of a control means in the apparatus of FIG. 2.

A configuration of control means in the aforementioned apparatuses will be described below based on FIG. 7. FIG. 7 is a control block diagram, and in the system where the image formation apparatus A and bookbinding apparatus B are coupled as shown in FIG. 1, for example, a control CPU 70 provided in the image formation apparatus A is provided with a control panel 71 and mode setting means 72. Then, a control section of the bookbinding apparatus B is provided with a control CPU 75, and the control CPU 75 reads a bookbinding processing execution program from ROM 76 to execute each processing in the bookbinding path 33.

Further, the control CPU 75 receives a post-processing mode designation signal, job finish signal, sheet size information, and other information and command signal required for bookbinding from the control CPU 70 of the image formation apparatus A. Meanwhile, sheet sensors Se1 to Se6 for detecting a transported sheet (bunch of sheets) are disposed in respective positions as shown in FIG. 2 in the carry-in path 31, bookbinding path 33, and cover transport path 34. Then, a detection signal of each of the sheet sensors Se1 to Se6 is conveyed to the control CPU 75, and the control CPU 75 is provided with a "collecting section control section 75a", "adhesive applying means control section 75b", "cover fastening means control section 75c", "trimming control section 75d", "stack control section 75e", and "adhesive temperature control section 79".

The aforementioned trimming control section 75d is connected to respective driver circuits of the driving motors to control the bunch position changing means 64, trimming blade 65x and trimming edge pressing means 65b. In other words, the control section 75d is connected to the driver circuits of the lifting/lowering motor Ma, turn motors Mt1, Mt2 and grip motor Mg provided in the bunch position changing means 64. The control section 75d is further connected to the driver circuit of the cutter motor Mc provided in the trimming blade 65x and a position sensor (not shown) of the trimming blade. Furthermore, the control section 75d is connected to the driver circuit of a driving motor not shown for pressuring and controlling the pressing member 65b of the trimming edge pressing means 65. Concurrently therewith, the trimming control section 75d is connected to the driver circuit of the shift motor MS of the blade receiving member 67, while being connected to receive a detection signal of the encoder sensor ES.

[Description of Trimming Operation]

Figure 8:
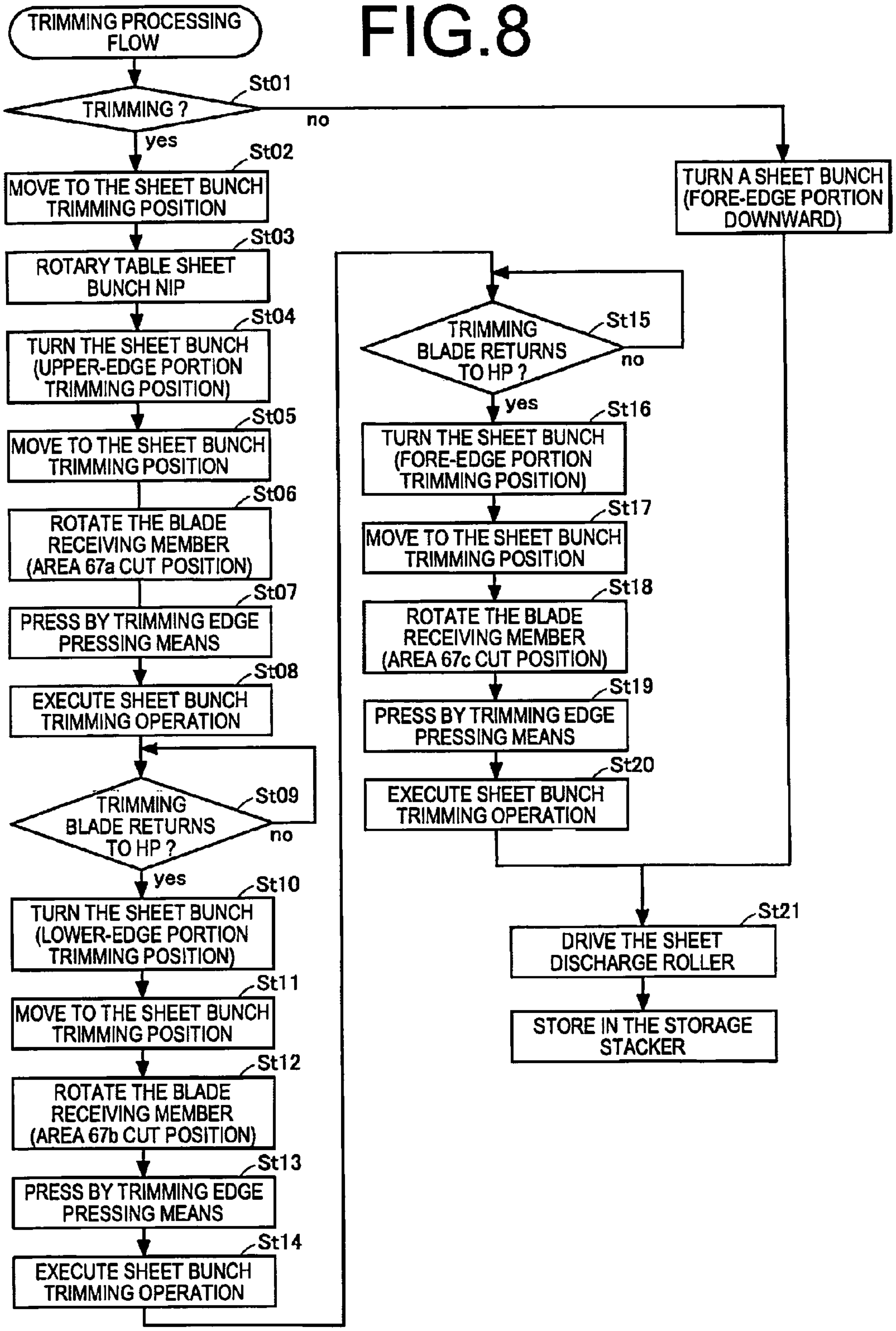
FIG. 8 is a flowchart illustrating procedures of the trimming operation in the apparatus of FIG. 2.

Described next is the control operation of the aforementioned control CPU 75. FIG. 8 is a flowchart of the trimming operation. When the operation of binding a bunch of sheets is completed in the cover fastening position F, the control CPU 75 determines whether or not a "trimming mode" is selected in the mode setting means 72 (St01). When the trimming mode is set, the control CPU 75 releases the grip transport means 47 from the bunch of sheets to return to an initial position. At this point, the control CPU 75 positions the trimming blade 65x in the cutting position Cp to receive the dropping bunch of sheets (St02). In this state, the movable grip rotating member 64b is moved from the waiting position to a sheet gripping position, and nips and holds the bunch of sheets with the rotating member 64a (St03). Next, after returning the trimming blade 65x to the waiting position Wp, the control CPU 75 turns the rotating members 64a, 64b 90 degrees, and shifts the upper-edge portion of the bunch of sheets to the lower end (St04). Using a finish signal of position shift of the bunch of sheets, the control CPU 75 rotates the shift motor MS a predetermined amount to position the area 67a of the blade receiving member 67 in the trimming position G (St05). This rotation control is performed by detecting the flag 67f corresponding to the area 67a using the encoder sensor ES, and determines the position. By this means, in the blade receiving member 67, the blade receiving surface of the area 67a is opposed to the cutting edge of the trimming blade 65x (St06). After the position of the blade receiving member 67 is shifted, the pressing member 65b presses the bunch of sheets to hold, and the trimming blade 65x trims the sheets by a predetermined amount (St07, St08).

Next, the control CPU 75 retracts the pressing member 65b and trimming blade 65x to the waiting positions (St09). Then, the control CPU 75 turns the bunch of sheets 180 degrees to change the position so that the lower-edge portion is the lower end (St10). Using a finish signal of position shift of the bunch of sheets, the control CPU 75 rotates the shift motor MS a predetermined amount to position the area 67b of the blade receiving member 67 in the trimming position G (St12). By this means, in the blade receiving member 67, the blade receiving surface of the area 67b is opposed to the cutting edge of the trimming blade 65x (St12). Then, the pressing member 65b presses the bunch of sheets to hold, and the trimming blade 65x trims the sheets by a predetermined amount (St13, St14).

Next, as in the previous manner, the control CPU 75 retracts the pressing member 65b and trimming blade 65x to the waiting positions (St15). Then, the control CPU 75 turns the bunch of sheets 90 degrees to change the position so that the fore-edge portion is the lower end (St16) to shift the sheets to the trimming position (S017). Using a finish signal of position shift of the bunch of sheets, the control CPU 75 rotates the shift motor MS a predetermined amount to position the area 67c of the blade receiving member 67 in the trimming position G. By this means, in the blade receiving member 67, the blade receiving surface of the area 67c is opposed to the cutting edge of the trimming blade 65x (St18).

Then, the pressing member 65b presses the bunch of sheets to hold, and the trimming blade 65x trims the sheets by a predetermined amount (St19, St20). After thus trimming the outer edge of the bunch of sheets to align, the control CPU 75 finishes trimming in three directions of the bunch of sheets, and then, shifts to sheet discharge operation (St21). Meanwhile, when the trimming mode is not selected in above-mentioned step St01, the control means 75 shifts to the sheet discharge operation (St21).

In such a process, the invention is characterized by trimming a bunch of sheets in the order of the upper-edge portion, lower-edge portion and fore-edge portion. This is because the spine portion of the bunch of sheets is bound with a cover (case work) using an adhesive or the spine portion is bound with an adhesive (glue bookbinding). Therefore, when the adhesive completely solidifies, wear of the trimming blade 65 becomes intense. Hence, it is preferable to trim the adhesive solidifying to the extent suitable for trimming in a relatively short time. Then, the upper-edge portion and lower-edge portion are first trimmed, and subsequently, the fore-edge portion is trimmed.

At this point, there is a potential that the adhesive adheres to the blade receiving surface in the blade receiving member 67. To cope therewith, the invention forms the blade receiving surface of the blade receiving member 67 by the first blade receiving area (area 67a and area 67b) and second blade receiving area (area 67c) that are different blade receiving surfaces. Accordingly, in trimming the fore-edge portion, the adhesive remaining on the blade receiving surface in the previous trimming processing does not stain the cover surface.

At this point, the rotation direction of the blade receiving member 67 is clockwise rotation shown by the arrow in FIG. 5(b). This is because even when a trimmed paper piece adheres to the blade receiving surface, the piece is shaken off by rotation of the blade receiving surface, and the debris storage box 69 is disposed under the member. As the rotation of the blade receiving member 67, it is possible to adopt rotating the shift motor MS forward and backward to vibrate the blade receiving member 67, and further, it is possible to continue the rotation of the blade receiving member 67 for a period during which a position of a bunch of sheets is changed. By such control, it is possible to shake off trimmed paper pieces adhering to the blade receiving surface toward the debris storage box 69 on the lower side.

In addition, this application claims priority from Japanese patent application No. 2009-112182 incorporated herein by reference.

What is claimed is:

1. A bookbinding apparatus for trimming and cutting a bunch of sheets subjected to bookbinding using an adhesive, comprising:

adhesive applying means for applying the adhesive to a back portion of the bunch of sheets;

a transport path for feeding the bunch of sheets with the adhesive applied thereto to a predetermined trimming position;

a trimming blade disposed in the trimming position;

bunch position changing means disposed in the transport path to change a position of the bunch of sheets in the trimming position;

a blade receiving member disposed opposite to the trimming blade with the bunch of sheets in the transport path therebetween, and having at least first and second blade receiving areas with different blade receiving surfaces contacting with the trimming blade; and driving means positioning the trimming blade between a cut position for bringing the trimming blade into contact with the blade receiving member and a spaced waiting position, shift means selectively shifting one of the first and second blade receiving areas to a predetermined trimming position, and control means for controlling the shift means and the driving means, said control means being configured such that when an upper-edge portion and a lower-edge portion of the bunch of sheets, which have the adhesive, are trimmed by the trimming blade, the blade receiving member is shifted to the first blade receiving area, and when a fore-edge portion without the adhesive is trimmed by the trimming blade, the blade receiving member is shifted to the second blade receiving area.

2. A bookbinding apparatus according to claim 1, further comprising a backup member for supporting the bunch of sheets, and trimming edge pressing means for pressing the bunch of sheets against the backup member to hold, in the trimming position, and the blade receiving member and the backup member are disposed vertically and perpendicular to the trimming blade.

3. The bookbinding apparatus according to claim 2, wherein the bunch position changing means changes a position of the bunch of sheets for trimming the upper-edge portion, the lower-edge portion and the fore-edge portion of the bunch of sheets with a cover fastened thereto, or performs two-direction trimming for trimming one of the upper-edge portion and the lower-edge portion, and the fore-edge portion.

4. A bookbinding apparatus according to claim 2, wherein the control means further controls the shift means so that one of the blade receiving areas to be used is moved to a position to be able to contact a sheet surface of the bunch of sheet, and the other of the blade receiving areas is moved to a back surface side not to contact the sheet surface of the bunch of sheet.

5. A bookbinding apparatus according to claim 2, wherein the backup member comprises an open portion to contact one of the first or second blade receiving area with a sheet surface of the bunch of sheets, and an area of the open portion is narrower than the first or second blade receiving area.

6. A bookbinding apparatus according to claim 1, wherein the blade receiving member is made circular or polygonal in cross section, and is axially supported by an apparatus frame to be rotatable, and the control means varies an angular position of the blade receiving member corresponding to a trimming side of the bunch of sheets in a position changed by the bunch position changing means.

7. The bookbinding apparatus according to claim 6, wherein the bunch position changing means changes a position of the bunch of sheets for trimming the upper-edge portion, the lower-edge portion and the fore-edge portion of the bunch of sheets with a cover fastened thereto, or performs two-direction trimming for trimming one of the upper-edge portion and the lower-edge portion, and the fore-edge portion.

8. A bookbinding apparatus according to claim 1, wherein a debris storing portion for storing trimmed paper pieces is provided below the blade receiving member, and the control means shifts a position of the blade receiving member to a direction for guiding trimmed paper pieces to the debris storing portion in varying a blade receiving position of the blade receiving member.

9. The bookbinding apparatus according to claim 8, wherein the bunch position changing means changes a position of the bunch of sheets for trimming the upper-edge portion, the lower-edge portion and the fore-edge portion of the bunch of sheets with a cover fastened thereto, or performs two-direction trimming for trimming one of the upper-edge portion and the lower-edge portion, and the fore-edge portion.

10. A bookbinding apparatus according to claim 1, wherein the control means moves the blade receiving member back and forth in varying a blade receiving position of the blade receiving member to cause vibration, and by the vibration, trimmed paper pieces adhering to the blade receiving member are dropped.

11. The bookbinding apparatus according to claim 10, wherein the bunch position changing means changes a position of the bunch of sheets for trimming the upper-edge portion, the lower-edge portion and the fore-edge portion of the bunch of sheets with a cover fastened thereto, or performs two-direction trimming for trimming one of the upper-edge portion and the lower-edge portion, and the fore-edge portion.

12. A bookbinding apparatus according to claim 1, further comprising:

cover fastening means for fastening a cover sheet to the back portion of the bunch of sheets with the adhesive applied thereto.

13. The bookbinding apparatus according to claim 1, wherein the bunch position changing means changes a position of the bunch of sheets for trimming the upper-edge portion, the lower-edge portion and the fore-edge portion of the bunch of sheets with a cover fastened thereto, or performs two-direction trimming for trimming one of the upper-edge portion and the lower-edge portion, and the fore-edge portion.

14. A bookbinding apparatus according to claim 1, wherein the control means further controls the shift means so that one of the blade receiving areas to be used is moved to a position to be able to contact a sheet surface of the bunch of sheet, and the other of the blade receiving areas is moved to a back surface side not to contact the sheet surface of the bunch of sheet.

* * * * *